Patented Jan. 23, 1940

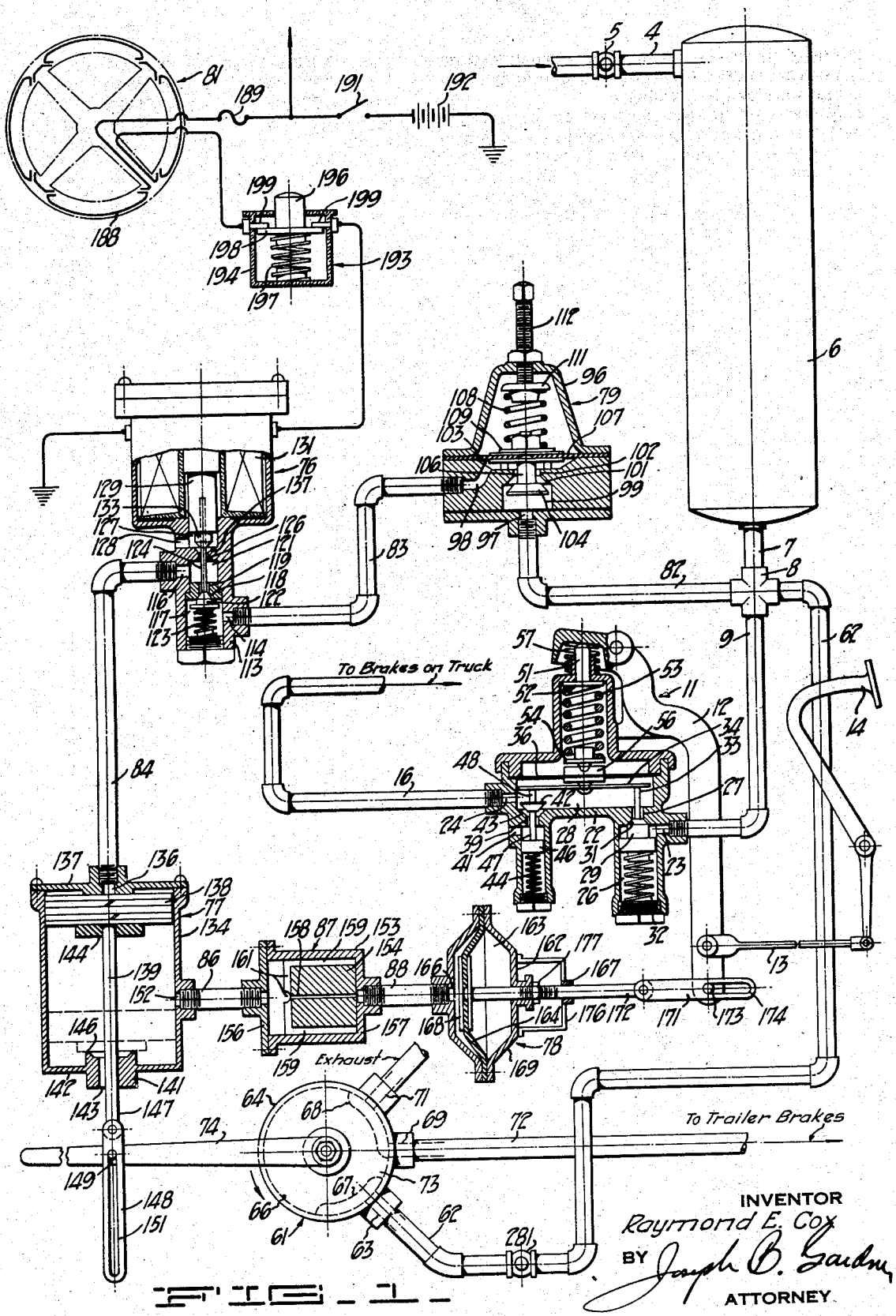

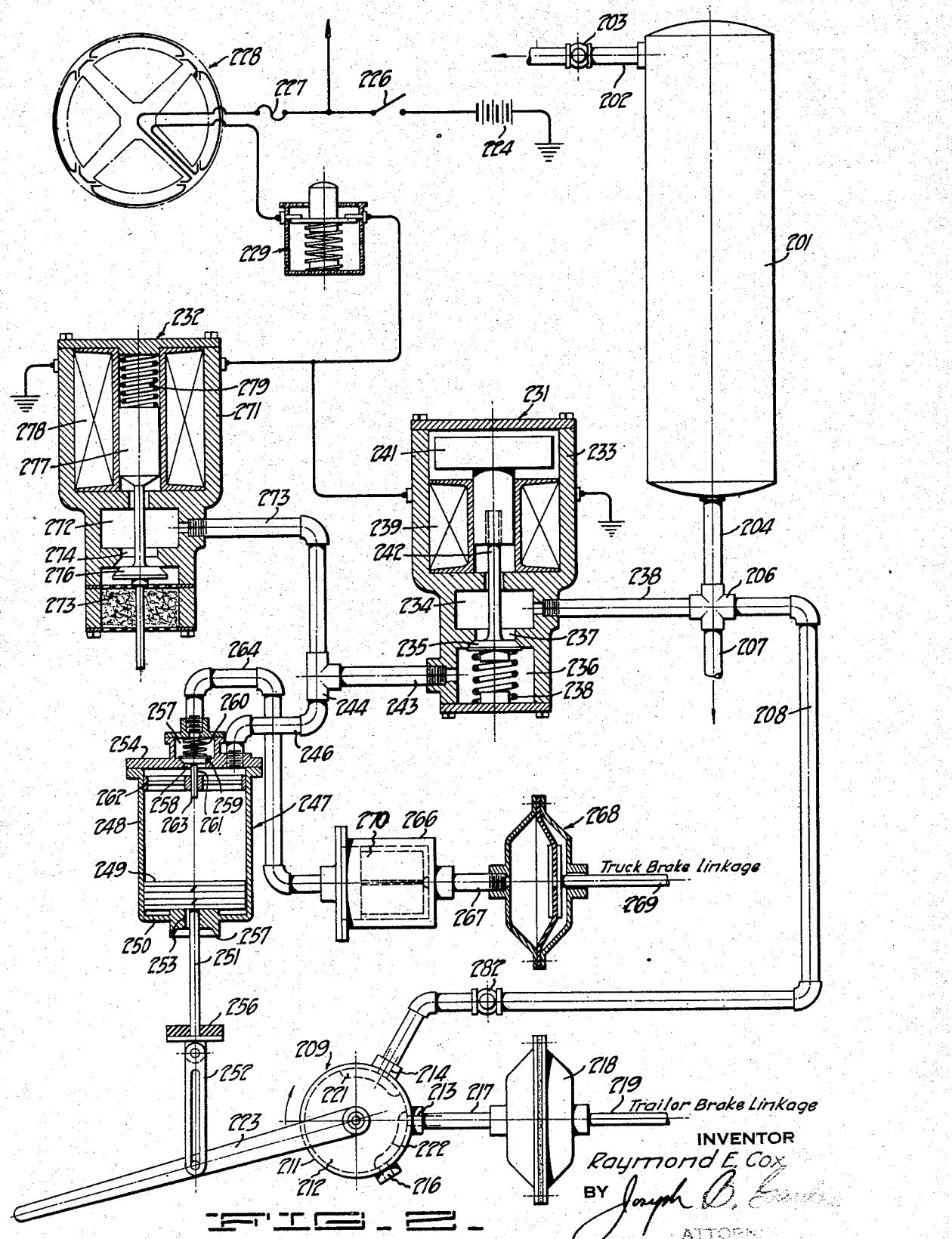

2,188,200

UNITED STATES PATENT OFFICE 2,188,200

AUTOMOBILE AND TRAILER BRAKE CONTROL MECHANISM

Raymond E. Cox, Oakland, Calif., assignor of one-fourth to Otto C. Elmstedt and one-fourth to Walter N. Basham, both of Oakland, Calif.

Application November 25, 1938, Serial No. 242,322

15 Claims. (Cl. 188—3)

The invention relates to a brake control system of the type disclosed in my Patent Number 2,128,916, and being generally characterized as an automatic brake control mechanism which is so embodied in conjunction with the steering wheel of an automobile as to automatically cause a setting of the brakes of the automobile upon release of the steering wheel by the driver during operation of the automobile, whereby the vehicle will be promptly brought to a safe stop in the event that the driver falls asleep or otherwise lapses into unconsciousness.

As is understood one of the principal contributing causes of automobile accidents particularly involving trucks, buses, and the like, engaged in relatively long hauls of freight or passengers, has been attributed to the driver falling asleep at the wheel of the vehicle and thereby losing control of the vehicle's movement. Such a dangerous condition is also rendered more likely in travel during the colder periods of the year when the driver tends to close in his compartment to retain warmth and in so doing may effect a sufficient depletion of oxygen in the compartment and an increase of carbon monoxide to induce drowsiness.

The problem of providing an automatic brake control system of the character above described is substantially different and more difficult in the case of a multi-type vehicle, that is, one including a propelling vehicle and a trailing vehicle, such as a truck and trailer, or the like, than where such system is applied to a single automotive unit. In the case of a multi-type unit a proper and coordinated application of the brake must be effected in order to provide a smooth and prompt stopping of the two vehicles and to prevent the placing of undue stress on the coupling or tie means between the vehicle and to prevent a misalignment of the vehicle, etc. commonly known as "jack-knifing". In order to accomplish the proper braking of a vehicle unit of the character described, each of the vehicles, that is, the propelling vehicle and the trailing vehicle, is provided with a separate brake mechanism and separate and independent manual controls for the two brake mechanisms are mounted in the driver's compartment of the propelling vehicle. In this manner the driver may actuate the two separate controls to apply the braking force first to the trailing vehicle prior to the application of the braking force to the propelling vehicle and thereafter continue to apply at least as great a force to the trailing vehicle than to the propelling vehicle so that at no time will the trailing vehicle tend to push forward into the propelling vehicle.

In accordance with the present invention and as a principal object thereof, I have provided for an automatic brake control system for an automobile and trailer unit wherein the brakes of both of said units will be actuated automatically upon the driver releasing his grip on the steering wheel, and which will further provide for the proper energization of the brakes on each unit both as to time and amounts so that the multi-type vehicle will be brought to a smooth but speedy stop upon the driver of the vehicle lapsing into unconsciousness.

Another object of the invention is to provide a brake control system of the character described which is particularly adapted for pneumatic operation using either compressed air or other operating fluids or a vacuum source.

Another object of the invention is to provide a brake control system of the character described to which while affording a proper and necessary delay in the application of the brakes to the propelling vehicle will at the same time upon re-gripping of the steering wheel, or other operations provided for releasing the brakes, provide a substantially immediate release of the brakes of the propelling vehicle, and in so doing will release the brakes of the propelling vehicle prior to the release of the brakes of the trailing vehicle.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and descriptions may be adopted within the scope of the invention as set forth in the claims.

Referring to said drawings:

Figure 1 is a diagrammatic representation of an automobile and trailer brake control mechanism constructed in accordance with the present invention, the several parts of the mechanism being broken away and shown in section to illustrate their operation.

Figure 2 is a diagrammatic representation similar to Figure 1 but showing a modified control mechanism.

The brake control system of the present invention is as aforementioned especially adapted for use with a combination propelling vehicle and a trailing vehicle and consists briefly in independent and normally separately operated brake mechanisms for each of the vehicles and means operated automatically upon release of grip of the steering wheel for energizing said brake mechanisms and providing for the application of the trailer brakes prior to the application of the propelling vehicle brakes.

The control system, as illustrated in Figure 1 of the drawings, is arranged for pneumatic pressure operations and includes as part thereof a reservoir 6 charged with compressed air or other fluid by way of inlet conduit 4 and check valve 5 therein for maintaining the pressure in the reservoir. The reservoir is connected by discharge conduit 7 to a multiple outlet fitting 8 and thence by conduit 9 to a foot control valve 11. The latter is normally opened and closed and regulated as to quantity of air flow by displacement of an operating lever 12 which is connected by link 13 to a foot pedal 14 normally positioned in the driver's compartment of the propelling vehicle. Air under pressure passes from the valve 11 by way of conduit 16 to the air brake chambers of the brake mechanism of the propelling unit. These air brake chambers are well known in the art and therefore not here shown.

The foot control valve as illustrated in Figure 1 comprises a casing 22 having inlet and discharge passages 23 and 24, to which the conduits 9 and 16 are connected. Passage 23 opens into the top of a valve chamber 26 and is communicated through the top wall of the chamber by way of opening 27 with an enlarged pressure chamber 28 with which the passage 24 registers. A reciprocal type of valve 29 mounted in the chamber 26 controls the flow of fluid from passage 23 into chamber 28 and, as here shown, normally engages with a valve seat 31 surrounding the opening 27 at the under side of the top wall of the chamber by means of a helical spring 32 compressed between the under side of the valve and the base of the chamber. The valve is provided with a stem 33 which extends upwardly through the opening 27 into engagement with the under side of a swivel plate 34, which is fulcrumed adjacent the center thereof to the under side of a pressure responsive diaphragm 36 mounted across the chamber 28 adjacent the top thereof. Means are provided for venting the chamber 28 and the discharge conduit 16 to the atmosphere upon closing of valve 29 and, as here shown, such means consists of a second valve chamber 37 communicated with chamber 28 by mean of opening 39 and communicated with the atmosphere by way of a port 41. A valve 42 in chamber 28 is arranged to engage valve seat 43 provided about the opening 39 at the base of chamber 28 and is normally held out of engagement with such seat by means of a helical spring 44 compressed between the spring seat 46 provided on a stem 47 of the valve and the base of the chamber 37. The upper end 48 of the stem 47 is arranged to engage the under side of the swivel plate 34 at the opposite side of its fulcrum from the valve stem 33. In order to provide for a seating of valve 42 prior to an opening of valve 31 so that chamber 28 will be shut off from the atmosphere upon application of pressure therein, spring 44 is constructed somewhat lighter than spring 32, so that depression of the swivel plate 34 at its fulcrum point will cause a rocking of the plate to close valve 42 before depression and opening of valve 31. It will also be noted that after valve 31 has been opened, the pressure in chamber 28 will assist in maintaining the valve 42 seated. Displacement of the plate 34 to so actuate the valve is here effected by means of the manually controlled lever 12 which is pivoted to the casing 22 and is engageable with the upper end of a stem 51 of a spring rest 52 bearing against the upper end of a helical spring 53 supported at its lower end on a spring rest 54, fulcrumed on a supporting plate 56 on the diaphragm 36. The lever 12 is normally held to release any downward force on the stem 51 by a helical spring 57 mounted against the actuating end of the lever and the body of the casing. From the foregoing, it will be clear that upon release of lever 12 to return the swivel plate 34 to normal position, as illustrated in Figure 1, the valve 31 will first close due to the greater force of spring 32 and after closing of valve 31 and further retraction of plate 34, spring 44 will cause an upward movement of valve 42 so as to vent chamber 28 and brake line 16 to the atmosphere.

The trailer brake mechanism is operated by means of a hand valve 61 which is preferably mounted within the driver's compartment of the propelling vehicle and which receives compressed air by way of conduit 62 which connects an air inlet port 63 of the valve to the multiple outlet fitting 8. The valve 61 here shown is of a rotary type including an outer valve casing 64 and an interior rotor 66 having a pair of circumferentially spaced side ports 67 and 68 which are arranged in a normal off position of the valve to communicate a discharge passage 69 in the casing by way of port 68 to an exhaust passage 71 in the casing. Upon rotation of the rotor in a counter-clockwise direction, as here shown, the port 68 is rotated away from registration with passage 69 and port 67 is rotated into communication with discharge passage 69 and the air inlet passage 63. The passage 69, as will be understood, is adapted for connection to the air brake chambers of the trailer vehicle, not shown, and such connection is here effected by conduit 72 connected to the valve outlet passage 69. Means for displacing the rotor into an operative position charging the trailer brake chambers with compressed air, or to an inoperative position, exhausting such brake chambers to the atmosphere, or to an intermediate position placing a portion 73 of the rotor across the passage 69 to hold the air compressed into the brake chambers, consists of an arm 74 which is fastened to and extends radially from the rotor.

In accordance with the foregoing, it will be clear that the operator of the propelling vehicle may by manual actuation of foot pedal 14 and arm 74 bring the propelling vehicle and the trailing vehicle to a stop. Ordinarily in so using the manual control, the operator will first displace arm 74 to set the brake of the trailing unit prior to the setting of the brakes of the propelling unit and will in the operation of these two controls maintain as great or greater braking force on the trailer than on the propelling unit.

In accordance with the present invention and as hereinabove pointed out, I provide a single automatic control means for the propelling vehicle brake valve 11 and the trailing vehicle brake valve 61 which automatically actuates these control valves to set the brakes of the two vehicles upon the driver of the propelling vehicle releasing his grip of the steering wheel, and which is further operative to automatically apply the brakes of the trailing vehicle prior to the application of the brakes of the propelling vehicle, in accordance with the manual operation above described. The automatic control system is also preferably operated by pneumatic pressure and here includes in brief an electric operating valve 76, a pneumatic operating cylinder 77 which is operatively connected to the arm 74 of the trailer brake valve 61, and a pneumatic diaphragm actuator 78, which is appropriately connected to the operating lever 12 of the control valve 11 of the propelling vehicle brake mechanism. Preferably a suitable reducing valve 79 is incorporated in the fluid circuit of the automatic control system for decreasing the full pneumatic pressure in the reservoir 6 for application in the control circuit. The electric operating valve 76 which controls the application of fluid to the actuators 77 and 78 is in turn controlled by an electric circuit operated from the steering wheel 81 of the propelling vehicle so that upon release of the operator's grip of the steering wheel, the valve 76 will be automatically operated to apply fluid to the actuators 77 and 78 to in turn apply the brakes of the two vehicles.

The fluid circuit of the automatic control mechanism, as here illustrated, includes conduit 82 connected between the fluid pressure outlet fitting 8 of the reservoir 6 and reduction valve 79, conduit 83 connected between the reducing valve 79 and the electric valve 76, conduit 84 connected between the electric valve 76 and the cylinder actuator 77, conduit 86 connected between actuator 77 and a flow retarder 87, and conduit 88 connected between the latter and the pneumatic diaphragm actuator 78.

The reducing valve, as here illustrated in Figure 1, comprises a valve casing 96 having an inlet passage 97 to which conduit 82 is connected and a discharge passage 98 to which conduit 83 is connected. Inlet passage 97 opens into a valve chamber 99 which is provided at an opposite end with a valve seat 101 and a passage 102 opening into a chamber 103 to which the discharge passage 98 is connected. Mounted in the chamber 99 for movement to and from the seat 101 is a valve 104 having a stem 106 passing through the passage 102 and secured to a diaphragm 107 mounted across the base of the chamber 103. The valve is normally held in partially open position by means of a spring 108 compressed between a supporting plate 109 at the diaphragm and a spring seat 111 on the inner end of a screw 112 threaded through the casing on the top of the chamber 103. The purpose of the above arrangement is to open and close the valve 104 in accordance with any fluctuations in the pressure in the intake passage 97 to produce a substantially constant and reduced output pressure after the passage 98. An increase of pressure in the valve chamber 99 will cause a lifting of the diaphragm 107 and a raising of the valve 104 towards the seat 101 to decrease the passage area and reduce the pressure to a predetermined value. Conversely, upon a decrease of pressure in the chamber 99, the spring 108 will press the diaphragm downward and will cause a further opening of the valve 104. The reduced output pressure may be controlled by adjustment of the screw 112 so as to increase or decrease the tension of spring 108.

The electric operating valve 76 is here shown of a magnetic solenoid type comprising a casing 113 having an intake passage 114, to which the conduit 83 is connected and a discharge passage 116 to which the conduit 84 is connected. Passage 114 opens into a valve chamber 117, which is provided at its upper end with a valve seat 118 and an opening 119 therethrough into a discharge chamber 121, to which the passage 116 is connected. Mounted in the chamber 117 is a valve 122 which normally is held by means of a spring 123 against the valve seat 118 and is provided with a stem 124 which extends through opening 119 and discharge chamber 121 and through an opening 126 above the discharge chamber connecting the latter with a chamber 127 vented to the atmosphere by port 128. The stem 124 is connected at its upper end to a magnetic plunger 129, whose movement is controlled by magnetic flux established by an electric coil 131 wound around the plunger. The base of the chamber 127 is formed with a valve seat 137 surrounding the opening 126 and the lower end 133 of the plunger is faced for engagement with the said seat upon actuation of the plunger by the energized coil to close off passage 126 and communication of discharge chamber 121 with the atmosphere. The lowering of the plunger and the valve 122 communicates the intake and discharge passages 114 and 116 for passage of fluid through the valve. On de-energizing of the coil 131 the plunger and valve 122 are returned to their former position, as illustrated in Figure 1, and the pressure in the discharge line 84 is relieved through the atmospheric port 128.

The pneumatic operating cylinder 77, as here illustrated, comprises an outer cylindrical casing 134 having an air inlet passage 136 in one end wall 137 thereof and which passage is arranged for connection to the conduit 84. Mounted for reciprocation within the cylinder is a piston 138 to which is attached a connecting rod 139 which extends axially through a bearing portion 141 in an opposite end wall 142 of the casing. Air under pressure entering the passage 136 forces the piston 138 longitudinally towards the end 142 and in so doing forces the air in the cylinder between the piston 138 and end 142 out of the cylinder by way of an air passage 143 provided in the bearing portion 141 of the casing. Preferably the connecting rod 139 is provided with a valve member 144 of compressible material which is adapted to seat against a valve seat 146 provided on the interior side of bearing 141 so that in the displaced position of the piston, the valve 144 will seal off passage 143 and prevent any leakage of compressed fluid by the piston 138 and to the atmosphere. The outer end 147 of the connecting rod 139 is pivoted to one end of a clevis 148 which is pivotally and slidably connected to the operating arm 74 of valve 61 by means of a pin 149 carried by the rod and engaging in an elongated slot 151 in the clevis. In this manner the longitudinal movement of piston 138 will be accompanied by a rotative movement of arm 74 to energize the trailer brakes almost immediately after start of movement of piston 138 from its normal position indicated in Figure 1. Preferably, in order to prevent release of the trailer brakes after the same have been set by the automatic control circuit and to enable such release only by a manual movement of valve arm 74, I do not provide any means for returning the piston 138 to its normal position after actuation thereof and after deenergizing of the magnetic valve and a venting of conduit 84 to the atmosphere. Thus after once actuated, the piston 138 will remain at the end 142 of the cylinder and the valve 61 will remain in position charging the trailer brakes with compressed fluid until there is a purposeful manual return of the valve arm 74 by one in control of the propelling vehicle.

In order to insure the application of the trailer brakes prior to the application of the propelling vehicle brakes, I connect the conduit 86 which carries the operating fluid to the diaphragm actuator 78 for the propelling vehicle brake valve 11, to the cylinder 77 in such a manner that fluid under pressure will not enter the conduit 86 until after the piston 138 has been displaced at least a portion of its distance in the cylinder. This is effected in the present embodiment by connecting the conduit 86 to a side port 152 in the cylinder wall intermediate to the ends 137 and 142 of the cylinder so that compressed fluid will not enter the conduit until after piston 138 has been displaced longitudinally to uncover the passage 152. Also, and as above indicated, I also incorporate in the fluid line to the actuator 78 a flow retarder 87 so that the operation of the actuator 78 will be somewhat delayed. The retarder device here illustrated comprises a casing 153 providing an interior cylinder in which is mounted a reciprocating piston valve 154 adapted for movement between the opposite ends 156 and 157 of the casing. The piston valve 154 is provided with a reduced axial bore 158 therethrough which is somewhat smaller than the passages provided by conduit 86 and 88 so as to restrict the fluid flow from the cylinder 77 to the actuator 78. The device is, however, constructed to provide a rapid and unrestricted fluid flow in a reverse direction. This is effected by providing the valve 154 with a plurality of longitudinal grooves 159 in the periphery thereof, which connect with radial grooves 161, (see Figure 1), at one end of the valve which engages with an end 156 of the casing. In this manner when the fluid flow is from the cylinder 77 to the actuator 78, the fluid flow presses the valve 154 to end 157 of the casing so that the only passage through the valve is the axial passage 158. On the other hand when the fluid flow is from the actuator 78 to the cylinder 77, the fluid flow presses the valve 154 against the end 156 of the casing and in this case the fluid may pass not only through the axial bore 158 but also through the longitudinal grooves 159 and the radial grooves 161.

The diaphragm actuator 78 may be of more or less standard form such as here shown comprising a casing 162 providing an interior chamber 163, which is divided by a diaphragm 164. Fluid pressure is communicated into the chamber at one side of the diaphragm through passage 166 to which the conduit 88 is connected. A push rod 167 is connected by means of a pair of reenforcing plates 168 to the diaphragm and extends out through one side 169 of the casing for connection to the operating lever 12 of the brake valve 11. This connection is here effected by means of a clevis 171 which is pivoted to the outer end 172 of the push rod and to the lever 12, in the latter instance by means of a pin 173 on the lever which slidably engages in a longitudinal slot 174 in the clevis. In this manner a displacement of the diaphragm and the push rod from left to right, as viewed in Figure 1, will cause a displacement of the operating lever 12 of the valve in the same manner as a depression of the foot pedal 14. After automatic operation of the brake mechanism and a re-gripping of the steering wheel by the operator, the applying pressure in the fluid control circuit is released at the magnetic valve as afore-described, and the compressed air in the chamber 163 of the diaphragm actuator 78 may then flow back through conduit 88 and 86 to the cylinder 77 where, as aforementioned, the piston 138 remains at the end of its throat, thereby allowing the air or other fluid in conduit 86 to be released through the cylinder and through conduit 84 to the exhaust port in the magnetic valve. In order to limit and to adjust the amount of throw of lever 12 by the actuator 78, I provide an adjustable stop means on the push rod 167 and the casing 162 which here includes a bracket 176 secured to side 169 of the casing and which is mounted in the path of a nut 177 threaded on the push rod between the bracket and the side 169.

The electric control circuit of the present system may be identical with that shown in my Patent Number 2,128,916 and here includes a steering wheel 81 which is provided with an electric switch contact member 188 which may be formed as a plurality of radial segments as described in my said patent so that upon gripping of the steering wheel the electric circuit at the wheel will be open and upon release of grip of the steering wheel the electric circuit will be closed through the steering wheel. The electric switch means on the steering wheel is connected in a series electric circuit with a fuse 189, the ignition switch 191 of the engine of the propelling vehicle, the battery 192 used in the electrical system of the propelling automobile, a manual switch 193, and the coils of the magnetic valve 76. The dual use of the ignition switch 191 and the battery 192 in both the automobile ignition circuit and the present brake control circuit is advantageous in causing the present control circuit to go into operation automatically upon operation of the engine and to go out of operation when the vehicle is not in use.

The switch 193 is normally held in closed position and is used in the circuit only to enable the operator to purposefully prevent the operation of the brake control system when he releases his grip on the steering wheel. The switch 193 may be conveniently mounted in the driver's compartment for operation by the latter's foot and should be placed in a somewhat out-of-the-way position so that the same would not normally be engaged by the operator's foot. The switch here shown comprises a casing 194 which carries a reciprocating plunger 196 normally held by a spring 197 within the casing in a position engaging a contact bar 198 carried thereby with the stationary contact 199. The switch may be opened by pressing the plunger 196 into the casing 194 to disengage contact bar 198 with contact 199.

In Figure 2 I have illustrated a modified form of the invention wherein the automatic brake control means is adapted for use with a vacuum brake system. As here shown a source of reduced fluid pressure is maintained in a vacuum reservoir 201 from which air or other operating fluid is withdrawn by means of the intake manifold of the internal combustion engine of the propelling vehicle or by means of a vacuum pump, or the like, by way of a conduit 202 in which is included a check valve 203 for maintaining the reduced pressure in the reservoir 201. The reservoir is connected by conduit 204 to a distributing fitting 206 and a conduit 207 is connected to the fitting for connection to a manual foot control valve of the propelling vehicle brake system. Similarly a conduit 208 is connected to the fitting 206 and extends to a manual hand control valve 209 for regulating the application of the brakes of the trailing vehicle. The valve 209 is essentially similar to the valve 61 of the first embodiment and includes a cylindrical casing 211 and an interior rotor 212 and is formed with a fluid inlet passage 213 spaced circumferentially between an air or fluid discharge passage 214 and an atmospheric air inlet passage 216. A conduit 217 is connected to the passage 213 and to a pneumatic diaphragm actuator 218 which is essentially similar in construction to the actuator 78 of the first embodiment and having a pull rod 219 adapted for direct connection to the brake linkage mechanism of the trailing vehicle. The rotor 212 is provided with a port 221 in the periphery thereof which in a rotated position of the rotor is adapted to communicate passages 213 and 214 for energizing the actuator 218. A second peripheral port 222 is provided in the rotor which in the normal position of the same communicates passages 213 and 216 which releases the applying pressure in the actuator 218. A handle 223 is provided on the rotor for moving the same between the rotated positions mentioned.

An electric circuit is used the same as in the first embodiment and including a battery 224, an ignition switch 226, a fuse 227, a steering wheel and switch contact thereon 228, and a manual control switch 229. Energized by this electrical circuit are two electro-magnetic valves 231 and 232 for respectively communicating the automatic control fluid circuit to the vacuum reservoir and to the atmosphere. The valve 231 comprises a casing 233 having an interior valve chamber 234 connected to a spaced air inlet chamber 236 by means of a passage 237. A conduit 238 connects the chamber 234 to the fitting 206 and this chamber is normally sealed off from chamber 236 by means of a valve 235 which is held in sealed relation across passage 237 by means of a helical spring 238 and the pressure differential normally existing between chambers 234 and 236. The valve mechanism is provided with an electric magnetic coil 239 which when energized displaces a magnetic plunger 241 against a stem 242 of the valve for opening the passage 237. Chamber 236 is connected by conduit 243 to a fitting 244 and thence by conduit 246 to a vacuum cylinder actuator 247. The latter comprises a cylindrical casing 248 providing an internal cylinder in which is mounted a reciprocating piston 249, having a connecting rod 251 extending axially from one end 250 of the casing. The rod 251 is connected by means of a clevis 252 to the arm 223 of the valve 209, a suitable slip joint being provided between the clevis and the arm to provide for the rotation of the arm by the clevis in one direction only and that to rotate the rotor of the valve from the normal position shown to a position energizing the actuator 218. The end wall 250 of the casing 248 is preferably provided with an air inlet passage 253 which enables air to enter the cylinder to displace the piston as the same is drawn towards the opposite end 254 by the reduced pressure, and this passage is closed at the end of the piston movement by means of a compressible valve member 256 which engages a valve seat 257 in the end 250 of the casing surrounding the passage 253.

The movement of piston 249 is utilized in this embodiment similar to the first embodiment to provide a delayed operation of the energization of the brakes of the propelling vehicle. As here shown an air inlet chamber 257 is provided on the casing 248 at the exterior of end wall 254 and this chamber is communicated to the interior of the cylinder by means of a passage 258 which is normally closed by valve 259 in the chamber and is seated by a light spring 260 against the passage at the chamber side thereof. The valve 259 is provided with a stem 261 which extends axially into the interior of the cylinder and is supported adjacent its end by means of spider bearing support 262. The inner end 263 of the valve stem is normally spaced from the piston 249, but is engaged by the piston as the same moves under the influence of an applied vacuum to displace the valve and communicate chamber 257 with the interior of the cylinder. A conduit 264 is connected between chamber 257 and a flow retarding device 266 identical in construction with the device 87 of the first embodiment, and the latter is connected by conduit 267 to a pneumatic diaphragm actuator 268. The construction of this actuator is substantially identical to actuator 218 and actuator 78 of the first embodiment and is provided with a pull rod 269 which is connected directly to the brake linkage of the brake mechanism for the propelling vehicle. The interior valve 270 of the flow retarding device is reversed from its position shown in the first embodiment so as to retard the fluid flow from the actuator 268 to the chamber 257 but to allow a free and unrestricted flow of fluid from the chamber 257 to the actuator when the vacuum source is removed and atmospheric pressure substituted.

In order to release the brake mechanism of the propelling vehicle, the vacuum source is removed from communication with the actuator 268 and atmospheric pressure applied in its stead so that air may pass into the actuator to release the brakes connected thereto. Means for so venting the connected conduit to the atmosphere is here embodied in magnetic valve 232 which is connected in the electric control circuit jointly with valve 231 and actuated simultaneously therewith. Valve mechanism 232 comprises a casing 271 having an interior valve chamber 272 which is connected by conduit 273 to fitting 244 and thence to conduit 246 leading to the fluid control apparatus. Chamber 272 is communicated to the atmosphere through an air filter 273 by means of a passage 274. A valve 276 is mounted adjacent to the outer side of passage 274 and is normally spaced therefrom, but is pulled into sealing engagement across the passage by means of a magnetic plunger 277 which is in turn energized by an electric coil 278 connected in the aforesaid electric circuit. Normally the valve and plunger are held in a position leaving passage 274 open and unrestricted by means of a spring 279 which resiliently resists movement of the plunger upon energization of the coil 278 to close the passage 274.

The operation of this vacuum system is as follows: Upon release of grip of the steering wheel by the operator, valves 231 and 232 are energized so as to open the former and close the latter. Air is then drawn from cylinder 247 by way of conduits 246 and 243 into chamber 236 in valve 231, thence into chamber 234 and then by conduits 238 and 204 to the vacuum reservoir. The reduced pressure that is established in cylinder 247 actuates piston 249 which in turn actuates valve 209 to apply the reduced pressure of the reservoir to the actuator 218 for operation of the trailer brakes. A moment later, (the piston 249 engages valve stem 261 to open the valve and communicate the reduced pressure to actuator 268 for operation of the brake mechanism of the propelling vehicle. Upon re-gripping of the steering wheel, valve 231 moves to a closed position while valve 232 opens, thereby closing off communication to the vacuum source and communicating conduit 246 to the atmosphere. Air then flows into chamber 272 of valve 232 and through conduits 273 and 246 into cylinder 247 from where the air flows through chamber 257 and conduits 264 and 267 to relieve the reduced pressure in actuator 268. In this latter operation, valve 259 is held in open position against the resilience of spring 260 by the resistance to movement of the piston.

In order to adapt the control system of either of the embodiments above for operation without the trailing vehicle where the same may be detached, I prefer to include a manual shutoff valve 281 in conduit 62 of the first embodiment, and a manual shutoff valve 282 in conduit 208 of the second embodiment, which may be closed upon detaching of the trailing vehicle to prevent expending of the operating fluid through valves 61 and 209 when the trailer is not used. In order, therefore, to change from double to single vehicle unit operation, it is only necessary to close valve 281 or valve 282, according to the system herein used.

I claim:

1. A brake control system for a propelling vehicle and a trailing vehicle comprising, a steering wheel, an electric switch contact member mounted for gripping with said wheel, brakes and operating means therefor on said propelling vehicle, brakes for said trailing vehicle and operating means therefor separate from said first means, an electrically operated means for effecting operation of said second and first means in successive order named, and an electric circuit connecting said contact member and said third means for automatically operating same upon release of said wheel and contact member.

2. An automotive brake control system for a propelling vehicle and a trailing vehicle comprising, separate brake mechanisms for said vehicles, and a single manually operative means for effecting actuation of both of said brake mechanisms and operable to automatically effect actuation of said brake mechanism for said trailing vehicle prior to the actuation of said propelling vehicle brake mechanism.

3. A brake control system for a propelling vehicle and a trailing vehicle comprising, a steering wheel for said propelling vehicle, an actuating member mounted for gripping with said wheel, pneumatic brake mechanism for said propelling vehicle, pneumatic brake mechanism for said trailing vehicle, a pneumatic reservoir, conduits connecting said reservoir and each of said brake mechanisms, a valve associated with each of said brake mechanisms and operable to apply and release the pneumatic fluid, a valve actuating means connected to said valve associated with said trailing vehicle brake mechanism, and means connected to said last named means and operative to effect the automatic opening of both of said valves upon release of the operator's grip on said steering wheel and member.

4. A brake control system for a propelling vehicle and a trailing vehicle comprising, a steering wheel for said propelling vehicle, an actuating member mounted for gripping with said wheel, pneumatic brake mechanism for said propelling vehicle, pneumatic brake mechanism for said trailing vehicle, a pneumatic reservoir, conduits connecting said reservoir and each of said brake mechanisms, valve means connected in said conduits and having an operable connection with said actuating member and adapted upon release of the operator's grip on said steering wheel and member to automatically apply pneumatic fluid to said trailing brake mechanism and to said propelling vehicle brake mechanism.

5. A brake control system as characterized in claim 4 wherein said valve means and operative connection therefor are adapted upon re-gripping of said steering wheel and member and manual actuation of said valve means to stop the fluid flow and release said brake mechanisms and being effective to release said propelling vehicle brake mechanism prior to the release of said trailing vehicle brake mechanism.

6. A brake control system for a propelling vehicle and a trailing vehicle comprising, a steering wheel for said propelling vehicle, an actuating member mounted for gripping with said wheel, pneumatic brake mechanism for said propelling vehicle, pneumatic brake mechanism for said trailing vehicle, a pneumatic reservoir, conduits connecting said reservoir and each of said brake mechanisms, a valve associated with each of said brake mechanisms and operable to apply and release the pneumatic fluid, and means connected to said actuating member and said valves for causing the automatic opening of both of said valves upon release of the operator's grip on said steering wheel and member, said last named means being operative to open the valve in the pneumatic circuit for said trailing vehicle brake mechanism prior to the opening of said valve associated with said propelling vehicle brake mechanism.

7. A brake control system as characterized in claim 6 wherein said last named means is operative upon re-gripping of the steering wheel and member and manual actuation of said valves to close said valves and release said brake mechanisms and being effective to close the valve in said propelling vehicle brake mechanism and release said mechanism prior to the closing of the valve in the trailing vehicle brake mechanism and release of same.

8. A brake control system for a propelling vehicle and a trailing vehicle comprising, a steering wheel for said propelling vehicle, an actuating member mounted for gripping with said wheel, a brake mechanism for said propelling vehicle and actuating means therefor, a brake mechanism for said trailing vehicle and actuating means therefor, means connected to said actuating member and said last named means for automatically effecting actuation of said brake mechanisms upon release of the operator's grip on said steering wheel and member and including, a pneumatic reservoir, pneumatic actuators connected to each of said brake mechanism actuating means, conduits connecting said pneumatic actuators to said reservoir, and valve means associated with said conduits and connected to said actuating member and being automatically operated upon release of the latter to effect energization of said pneumatic actuators and adapted to effect energization of the actuator for said trailing vehicle brake mechanism prior to the energization of the actuator for said propelling vehicle brake mechanism.

9. A brake control system for a propelling vehicle and a trailing vehicle, each provided with pneumatic brake mechanisms, a pneumatic reservoir, conduits providing a pair of fluid circuits connecting said reservoir to said brake mechanisms, valves and manual operating means therefor for applying operating fluid to said respective brake mechanisms, a steering wheel for said propelling vehicle, an electric switch contact member mounted for gripping with said wheel, a pneumatic circuit for actuating said valves independent of the manual operating means therefor, a magnetic valve connected in said last named circuit and electrically connected to said switch contact member to provide an automatic opening of said magnetic valve upon release of grip of said wheel and switch contact member to actuate said valves and providing upon re-gripping of said wheel and contact member for a closing of said last named fluid circuit and an exhausting of fluid pressure therein.

10. A brake control system for a propelling vehicle and a trailing vehicle, each provided with pneumatic brake mechanisms, a pneumatic reservoir, conduits providing a pair of fluid circuits connecting said reservoir to said brake mechanisms, valves and manual operating means therefor for applying operating fluid to said respective brake mechanisms, a steering wheel for said propelling vehicle, an electric switch contact member mounted for gripping with said wheel, pneumatic actuators connected to said valves for operation thereof independent of said manual operating means, conduits connecting said reservoir to said actuators, a magnetic valve mounted in one of said conduits and electrically connected to said switch contact member for automatically opening the fluid flow to said actuators upon release of grip of said steering wheel, said pneumatic actuator for said trailing vehicle brake valve comprising a cylinder and reciprocating piston therein connected to said valve for direct operation thereof upon application of fluid to said actuator, said actuator for said propelling vehicle brake valve comprising a fluid chamber and diaphragm therein connected to said last named valve and a conduit connecting said chamber to a side of said cylinder for receipt of operating fluid in said conduit only after an initial movement of said piston and an initial actuation of said trailing vehicle brake valve whereby said trailing vehicle brake mechanism will be actuated prior to the actuation of said propelling vehicle brake mechanism.

11. A brake control system as characterized in claim 10 and provided with means in said last named conduit for restricting the fluid flow therethrough to said actuator connected thereto and providing a relatively faster flow through said conduit in a reverse direction for releasing said actuator.

12. A brake control system for a propelling vehicle and a trailing vehicle, a brake mechanism for said propelling vehicle, a brake mechanism for said trailing vehicle, a source of reduced air pressure, pneumatic actuators connected to said brake mechanisms, conduits connecting said source to said actuators, magnetic valve means connected to one of said conduits for communicating said actuators to said source and for closing off said communication and connecting said actuators to the atmosphere, a steering wheel for said propelling vehicle, an electric switch contact member mounted for gripping with said wheel, and an electric circuit connecting said switch contact member with said magnetic valve for automatically operating said actuators upon release of grip of said steering wheel and member.

13. A brake control system as characterized in claim 12 provided with means for delaying the communication of the actuator for said propelling vehicle brake mechanism to said source until after communication of said actuator for said trailing vehicle brake mechanism to said source.

14. A brake control system as characterized in claim 12 provided with means for delaying the communication of the actuator for said propelling vehicle brake mechanism to said source until after communication of said actuator for said trailing vehicle brake mechanism to said source, said means comprising a pneumatic cylinder, a piston reciprocally mounted therein and operatively connected to the actuator for said trailing vehicle brake mechanism, said cylinder being communicated to said magnetic valve for evacuation of the space therein for displacing said piston, a valve chamber communicated to the interior of said cylinder and connected to said actuator for said propelling vehicle brake mechanism, a valve normally sealing said chamber from said cylinder and extending into said cylinder for engagement and displacement and opening by said piston after movement of said piston to actuate said trailing brake mechanism whereby the actuation of said propelling vehicle brake mechanism will be delayed until after the actuation of said trailing vehicle brake mechanism.

15. A brake control system as characterized in claim 12 provided with means for delaying the communication of the actuator for said propelling vehicle brake mechanism to said source until after communication of said actuator for said trailing vehicle brake mechanism to said source, said means comprising a pneumatic cylinder, a piston reciprocally mounted therein and operatively connected to the actuator for said trailing vehicle brake mechanism, said cylinder being communicated to said magnetic valve for evacuation of the space therein for displacing said piston, a valve chamber communicated to the interior of said cylinder and connected to said actuator for said propelling vehicle brake mechanism, a valve normally sealing said chamber from said cylinder and extending into said cylinder for engagement and displacement and opening by said piston after movement of said piston to actuate said trailing brake mechanism whereby the actuation of said propelling vehicle brake mechanism will be delayed until after the actuation of said trailing vehicle brake mechanism, and means connected between said valve chamber and said actuator for said propelling vehicle for constructing the fluid flow from said last named actuator to said chamber and providing a free fluid flow in reverse direction.

RAYMOND E. COX.